United States Patent [19]

Jenkner et al.

[11] 4,394,484

[45] Jul. 19, 1983

[54] POLYPENTABROMOSTYRENE, PROCESS FOR THE PRODUCTION AND USE

[75] Inventors: Herbert Jenkner, Pulheim; Robert Strang, Cologne; Peter Adermann, Rösrath, all of Fed. Rep. of Germany

[73] Assignee: Chemische Fabrik Kalk GmbH, Cologne, Fed. Rep. of Germany

[21] Appl. No.: 280,979

[22] Filed: Jul. 7, 1981

[30] Foreign Application Priority Data

Jul. 7, 1980 [DE] Fed. Rep. of Germany ....... 3025666

[51] Int. Cl.³ .......................................... C08F 112/04
[52] U.S. Cl. ..................... 525/72; 525/169; 525/209; 526/75; 526/293
[58] Field of Search ................... 526/75, 293; 525/72, 525/169, 209

[56] References Cited

U.S. PATENT DOCUMENTS

| | | | |
|---|---|---|---|
| 3,507,816 | 4/1970 | Sims et al. | 526/293 |
| 3,534,012 | 10/1970 | Dennis | 526/293 |
| 3,959,398 | 5/1976 | Jalics | 526/293 |
| 4,279,808 | 7/1981 | Hornbaker et al. | 525/72 |

*Primary Examiner*—Harry Wong, Jr.
*Attorney, Agent, or Firm*—Millen & White

[57] ABSTRACT

Polypentabromostyrene with a bromine content of 76% to 80%, which is plastic at a temperature of 280° C. and is thermally decomposed at a temperature of about 400° C., can be produced by reacting pentabromophenylethyl bromide with an alkali metal hydroxide or carbonate in an alcoholic solvent and subsequently by catalytically initiating polymerization. The polypentabromostyrene is useful as a flame retardant for thermoplastic synthetic resins.

9 Claims, No Drawings

POLYPENTABROMOSTYRENE, PROCESS FOR THE PRODUCTION AND USE

BACKGROUND OF THE INVENTION

Aromatic bromine compounds have proven themselves well in numerous synthetic resins as flame retardants. Examples of such flame retardants are: penta- or decabromodiphenyl ether, octabromodiphenyl, the dibromopropyl ethers of tribromophenol or of tetrabromo-bis(hydroxyphenyl)propane, hexabromobenzene, and the like.

In the use of such aromatic bromine compounds in thermoplastic synthetic resins, processable only at high temperatures, high requirements are imposed on the thermal stability of such aromatic bromine compounds; in particular, splitting off of bromine or hydrogen bromide must be prevented at the processing temperatures of the respective thermoplastic synthetic resin, since this causes corrosion damage to the processing devices. However, the thermal stability of the aromatic bromine compounds must not be so great that, when the synthetic resin wherein they are incorporated is exposed to a flame, there is no splitting off of bromine or hydrogen bromide, as is necessary for the flame-retarding effect. Furthermore, the flame retardant must not migrate from the synthetic resin to the surface of the latter, since it can be removed from that location by mechanical effects; in this way the concentration of flame retardant in the synthetic resin is reduced to below the limit of intended effectiveness. One example of an aromatic bromine compound, which should be especially suitable as a flame retardant for synthetic resins due to its high bromide content, is hexabromobenzene. However, hexabromobenzene migrates very rapidly to the surface of the synthetic resin; in addition, it sublimes even at temperatures lying in the range of the processing temperatures for the above-discussed thermoplastic synthetic resins.

Therefore, an increasing number of suggestions has been advanced in recent times for aromatic bromine compounds as flame retardants which are not utilized in the monomeric state but rather in the polymeric form. The idea is to retain, on the one hand, the high thermal stability and to maximally prevent the exuding or blooming out of the synthetic resin, on the other hand. Such compounds are, for example, polymeric pentabromobenzyl acrylate or methacrylate. It has been found, however, that in large-scale tests the production of a unitary polypentabromophenyl acrylate cannot be readily accomplished, so that the flame retardant which actually is satisfactory is very expensive in its manufacture.

This leaves the task of finding a flame retardant for thermoplastic synthetic resins which is simple to produce, does not split off bromine or hydrogen bromide at the processing temperatures of 220°–280° C. of these thermoplastic synthetic resins, and does not migrate from the synthetic resin.

SUMMARY OF THE INVENTION

The present invention relates to polypentabromostyrene having a bromine content of between 76% and 80%, which is plastic at a temperature of above 280° C. and which is thermally decomposed at a temperature of above 400° C.

The bromine number, a measure of the quantity of double bonds contained in an organic compound, is advantageously determined according to the bromine addition method by Rosenmund and Kuhnhenn with an acetic acid solution of pyridine sulfate dibromide in chloroform/glacial acetic acid in the presence of mercury (II) acetate as the catalyst.

The solubility of polypentabromostyrene in the ordinary organic solvents is so low that its molecular weight cannot be determined. However, the molecular weight of polypentabromostyrene is at least so high that it does not migrate out of thermoplastic synthetic resins into which it has been incorporated as the flame retardant. In addition, the polypentabromostyrene of this invention is thermally stable in the temperature range used for processing thermoplastic synthetic resins, although it decomposes thermally at fire temperatures.

In order to produce the polypentabromostyrene of the invention, pentabromostyrene is heated, according to this invention, in an alcoholic solvent having a boiling point of above 100° C., e.g. methyl glycol, ethyl glycol, or also glycol, to a temperature of 100°–150° C., mixed in the alcoholic solvent with a solution of a polymerization catalyst, such as, for example, dibenzoyl peroxide, dicumyl peroxide, peroxydisulfate, tert-butyl perpivalate, or azobisisobutyronitrile, and the mixture is stirred for several hours, preferably 2–8 hours, whereupon the solids proportion is separated as the product from the cooled-down reaction mixture, washed with methanol, and dried at a temperature of 50°–70° C.

It is furthermore possible to produce the polypentabromostyrene of the invention from pentabromophenylethyl bromide by heating the latter to boiling in the presence of alkali metal hydroxide or carbonate, preferably sodium hydroxide or sodium carbonate, in a molar ratio to hydroxide or carbonate of 1:1.0 to 1:1.2 or 1:0.5 to 1:0.6 in an alcoholic solvent having a boiling point of above 100° C., preferably methyl glycol, until the water produced by the reaction has been driven off from the reaction mixture. Subsequently, the mixture, maintained at a temperature of about 120° C., is combined with a polymerization catalyst, preferably dicumyl peroxide or azobisisobutyronitrile, dissolved in the same alcoholic solvent, during the course of 2–5 hours whereupon the mixture is further agitated for several hours. The solids proportion is then separated from the cooled-down mixture, washed with methanol, and dried. The mother liquor can be reused at least in part for a new batch.

Glycol and ethyl glycol are furthermore suitable as the alcoholic solvents for this alternative versions of the process. Suitable polymerization catalysts for the process alternatives of the invention are dicumyl peroxide, dibenzoyl peroxide, peroxydisulfate, tert-butyl perpivalate, and azobisisobutyronitrile. The amount of polymerization catalyst is to be about 0.05–0.2 mole per mole of pentabromostyrene or pentabromophenylethyl bromide.

In accordance with the above-described process, polypentabromostyrene can be produced by steps which are inexpensive from a technical viewpoint and are simple to conduct.

The polypentabromostyrene of the invention is an excellent flame retardant for thermoplastic synthetic resins and synthetic resin mixtures, e.g. saturated polyesters, polyolefins, and polystyrene, especially in the form of ABS polymers and polybutadiene-modified high impact strength polystyrene. The amount of flame retardant to be utilized depends on the type of synthetic resin and the flameproofness to be obtained and is approximately 5-25% by weight, based on the weight of the synthetic resin mixture ready for use.

In the form of the polymer, polypentabromostyrene has a molecular size close to that of the thermoplastic synthetic resin to be protected, and therefore does not bleed out. Polypentabromostyrene consequently provides a permanent flame retardance in thermoplastic synthetic resins wherein it is contained.

EXAMPLE 1

50 parts by weight of pentabromostyrene is mixed under agitation with 130 parts by weight of methyl glycol. After this mixture has been heated to a temperature of 110° C., a solution of 1 part by weight of dicumyl peroxide in 20 parts by weight of methyl glycol is stirred into this mixture, and the latter is further agitated at a temperature of 120° C. for a period of 5 hours. After cooling, the thus-precipitated polymer is separated, washed first with methyl glycol and thereafter with methanol, and dried at 60° C. Yield: 48 parts by weight of polypentabromostyrene as a colorless, finely divided polymer, the softening point of which on the Kofler bench is above 280° C. The bromine number of the product is below 0.01.

EXAMPLE 2

870 parts by weight of pentabromophenylethyl bromide is combined with 126 parts by weight of a 50% aqueous sodium hydroxide solution and 2,000 parts by weight of methyl glycol and heated to boiling under agitation until the water has been driven out of the reaction mixture via a column. After the reaction mixture has reached a temperature of 120° C. during this step, respectively 12.5 parts by weight of dicumyl peroxide in 130 parts by weight of methyl glycol is added in metered amounts twice at 2 hour intervals. The reaction mixture is then stirred for another 2 hours at the same temperature. After subsequent cooling, the thus-produced polymer is separated in the way described in Example 1, washed, and dried. Yield: 686 parts by weight of polypentabromostyrene as a colorless powder. The softening point of this product on the Kofler bench is above 280° C., its bromine content is 78%, and its bromine number is below 0.01.

EXAMPLE 3

290 parts by weight of pentabromophenylethyl bromide is mixed with 32 parts by weight of sodium carbonate and 650 parts by weight of methyl glycol and heated to boiling under agitation. After 3 hours, a solution of 5 parts by weight of azobisisobutyronitrile in 105 parts by weight of methyl glycol is continuously added in metered amounts during the course of 3 hours. During this reaction period, the polymer is precipitated as a colorless, finely divided product. After another hour, the mixture is cooled to room temperature and filtered. The polymer is then washed with 50 parts by weight of methyl glycol and subsequently made into a slurry with a mixture of 480 parts by weight of methanol and 120 parts by weight of water, whereafter the mixture is refluxed under agitation for 1 hour. After the subsequent cooling, removing of the product by filtration, and drying, 230 parts by weight of polypentabromostyrene is obtained, the softening point of which on the Kofler bench is above 280° C. The bromine content is 78.6%; the bromine number is below 0.01.

EXAMPLE 4 (Usage)

A mixture of 77 parts by weight of ABS synthetic resin with a Vicat softening temperature of 99° C./5 kiloponds load, 17 parts by weight of polypentabromostyrene, 5 parts by weight of antimony trioxide, and 1 part by weight of carbon black batch is processed into a rolled sheet and this sheet is used to cut boards having a thickness of 3.2 mm for the flammability tests according to regulation UL 94 of Underwriters' Laboratories, U.S.A., and boards having a thickness of 2.0 mm for the bleeding-out test at a temperature of 80° C. in air. The 3.2 mm thick boards meet the aforementioned flammability test in class V0, whereas the 2 mm thick boards, after a 250 hour bleeding-out test, show no coating and no weight loss.

If pentabromostyrene is used instead of the polypentabromostyrene in the aforementioned mixture, then the boards show in a bleeding-out test white coatings and a bleeding-out rate of 9.4%. The freshly manufactured boards fulfill the conditions of class V0 of the aforementioned flammability test.

EXAMPLE 5 (Usage)

A mixture of 86 parts by weight of polyester synthetic resin (polybutene terephthalate), 10 parts by weight of polypentabromostyrene, and 4 parts by weight of antimony trioxide is processed in an injection molding machine to rod-shaped specimens having a thickness of 1.6 mm. These test rods fulfill, according to the flammability test UL 94, classification V0. Boards having a thickness of 2 mm are produced from the aforementioned mixture for the bleeding-out test. These boards show no coating after 108 hours of storage at 140° C.

EXAMPLE 6 (Usage)

A mixture of 81.5 parts by weight of polybutadiene-modified polystyrene (high impact polystyrene, HIPS), 14 parts by weight of polypentabromostyrene, and 4.5 parts by weight of antimony trioxide is processed as described in Example 5 to 1.6 mm thick test rods and 2 mm thick boards. The test rods meet the requirement UL 94, class V0 according to the flammability test. The boards, after 250 hours of storage at 80° C., show no coating and no weight loss.

The aforementioned flammability tests according to regulation UL 94 of Underwriters' Laboratories, U.S.A., are conducted as follows:

A specimen with a length of 127 mm and a width of 12.7 mm is clamped into a holder so that the longitudinal axis of the specimen extends vertically and its front edge is 9.5 mm above the flame tube of a bunsen burner. The burner is ignited away from the specimen, the nonluminous flame is adjusted to a height of 19 mm, and then the burner is placed underneath the center of the lower edge of the specimen. After 10 seconds, the burner is removed and the afterburning period and afterglow period of the specimen are measured. After complete extinction, the specimen is exposed to the flame for a second time for 10 seconds, and the second afterburning and afterglowing times are determined.

Thereafter the specimen is graded by the following classification:

V0=No afterburning period of, in total, more than 10 seconds; no afterglowing period of more than 30 seconds after second flame exposure; no dripping which would ignite cotton wool placed therebeneath.

V1 = No afterburning period of, in total, more than 50 seconds; no afterglowing period of more than 60 seconds after the second flame exposure; no dripping which would ignite cotton wool placed therebeneath.

V2 = No afterburning period of, in total, more than 50 seconds; no afterglowing period of more than 60 seconds after the second flame exposure; specimen may drip flaming particles and ignite cotton wool placed therebenath.

What is claimed is:

1. Polypentabromostyrene having a bromine content of between 76% and 80% and a softening point above 280° C. and which is thermally decomposed at a temperature of above 400° C.

2. A process for preparing polypentabromostyrene having a bromine content of between 76% and 80% and a softening point above 280° C. and which is thermally decomposed at a temperature of 400° C., comprising heating pentabromostyrene to a temperature of 100° C. to 150° C. in an alcoholic solvent having a boiling point of above 100° C. in the presence of an effective amount of a polymerization catalyst.

3. A process of claim 2, further comprising, prior to said heating step, first heating to boiling a mixture of pentabromophenylethyl bromide with an alkali metal hydroxide or carbonate, in an alcoholic solvent having a boiling point of above 100° C., until eventually all of the evolving water has been removed from said mixture, and then conducting the heating step of claim 2 by adding to the mixture remaining after the first heating step, during the course of 2 hours, a polymerization catalyst dissolved in an alcoholic solvent, the reaction mixture being maintained at a temperature of about 120° C.

4. A process of claim 2 or 3, wherein the solvent is methyl glycol, ethyl glycol or glycol.

5. A process of claim 2 or 3, wherein the catalyst is dibenzoyl peroxide, dicumyl peroxide, peroxydisulfate, tert-butyl perpivalate, or azobisisobutyronitrile.

6. A process of claim 3, wherein the alkali metal is sodium.

7. Polypentabromostyrene having a bromine content of between 76% and 80% and a softening point above 280° C. and which is thermally decomposed at a temperature of above 400° C., prepared by the process of claim 2 or 3.

8. A method of flameproofing a thermoplastic synthetic resin which comprises incorporating into the thermoplastic synthetic resin an amount of the polypentabromostyrene of claim 1 effective as a flame retardant.

9. The flame retardant thermoplastic synthetic resin composition comprising a thermoplastic synthetic resin and an amount of polypentabromostyrene of claim 1 effective as a flame retardant.

* * * * *